United States Patent
Cheong et al.

(10) Patent No.: US 10,139,880 B2
(45) Date of Patent: Nov. 27, 2018

(54) DATA STORAGE SYSTEM AND METHOD ANALYZING NON-SIGNAL

(71) Applicants: Wooseong Cheong, Suwon-si (KR);
Dae-Ho Kim, Hwaseong-si (KR);
Changhoon Han, Hwaseong-si (KR);
Daehyun Kim, Seongnam-si (KR);
Jaechun Park, Seongnam-si (KR)

(72) Inventors: Wooseong Cheong, Suwon-si (KR);
Dae-Ho Kim, Hwaseong-si (KR);
Changhoon Han, Hwaseong-si (KR);
Daehyun Kim, Seongnam-si (KR);
Jaechun Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 778 days.

(21) Appl. No.: 14/488,151

(22) Filed: Sep. 16, 2014

(65) Prior Publication Data
US 2015/0121099 A1    Apr. 30, 2015

(30) Foreign Application Priority Data

Oct. 25, 2013    (KR) .......................... 10-2013-0128020

(51) Int. Cl.
*G06F 1/32*    (2006.01)
*G06F 1/26*    (2006.01)

(52) U.S. Cl.
CPC ............ *G06F 1/266* (2013.01); *G06F 1/3287* (2013.01); *Y02D 10/171* (2018.01); *Y02D 50/20* (2018.01)

(58) Field of Classification Search
CPC ...................................................... G06F 1/266
See application file for complete search history.

(56) References Cited

U.S. PATENT DOCUMENTS

| | | | |
|---|---|---|---|
| 6,128,747 | A | 10/2000 | Thoulon |
| 7,752,343 | B2 | 7/2010 | Warren et al. |
| 7,925,799 | B2 | 4/2011 | Komori |
| 8,316,179 | B2 | 11/2012 | Ooi |
| 8,443,221 | B2 | 5/2013 | Kagan et al. |
| 8,508,557 | B2 | 8/2013 | Park et al. |
| 8,539,117 | B2 | 9/2013 | Radke et al. |
| 8,549,191 | B2 | 10/2013 | Mogilnitsky et al. |

(Continued)

FOREIGN PATENT DOCUMENTS

| | | |
|---|---|---|
| CN | 101887703 A | 11/2010 |
| CN | 102005180 A | 4/2011 |

(Continued)

OTHER PUBLICATIONS

SerialTek, BusXpert Logic Adapter with DEVSLP, 2011-2014.*

*Primary Examiner* — Jaweed A Abbaszadeh
*Assistant Examiner* — Sumil M Desai
(74) *Attorney, Agent, or Firm* — Volentine, Whitt & Francos, PLLC

(57) ABSTRACT

A non-signal analyzing method for a data storage system including a storage device connected to a host via a data line and a power line includes; communicating a non-signal from the host to the storage device via the power line, detecting the non-signal in the storage device and return the non-signal through to the host via the data line, and analyzing the returned non-signal using a protocol analyzer to generate analysis results characterizing the returned non-signal.

13 Claims, 13 Drawing Sheets

(56) References Cited

U.S. PATENT DOCUMENTS

| | | | |
|---|---|---|---|
| 9,213,400 B2* | 12/2015 | Wells | G06F 1/3268 |
| 2003/0088318 A1 | 5/2003 | Edogawa et al. | |
| 2004/0215421 A1* | 10/2004 | Schmitz | G06F 11/221 |
| | | | 702/183 |
| 2006/0271739 A1 | 11/2006 | Tsai et al. | |
| 2008/0162955 A1* | 7/2008 | Shimizu | G06F 1/266 |
| | | | 713/300 |
| 2009/0282290 A1* | 11/2009 | Noble | H04L 41/0681 |
| | | | 714/39 |
| 2009/0287432 A1* | 11/2009 | Fausak | H04B 3/48 |
| | | | 702/60 |
| 2010/0088454 A1 | 4/2010 | Chang et al. | |
| 2012/0117348 A1 | 5/2012 | Triantafillou et al. | |
| 2012/0191996 A1 | 7/2012 | Cheong | |
| 2012/0205128 A1 | 8/2012 | Goto | |
| 2012/0250791 A1 | 10/2012 | Khojastepour et al. | |
| 2012/0260116 A1 | 10/2012 | Chen et al. | |
| 2012/0278641 A1 | 11/2012 | Papakipos et al. | |
| 2013/0275654 A1 | 10/2013 | Chu | |
| 2014/0089693 A1* | 3/2014 | Ooi | G06F 1/3206 |
| | | | 713/320 |
| 2014/0095899 A1* | 4/2014 | Sultenfuss | G06F 1/266 |
| | | | 713/300 |

FOREIGN PATENT DOCUMENTS

| | | |
|---|---|---|
| EP | 0855718 A1 | 7/1998 |
| JP | 2003131956 A | 5/2003 |
| JP | 2006277420 A | 10/2006 |
| JP | 2010049581 A | 3/2010 |
| JP | 2010092743 A | 4/2010 |
| JP | 2012-065095 | 3/2012 |
| JP | 2012055711 A | 3/2012 |

* cited by examiner

FIG. 4

| Transmitter | Receiver |
|---|---|
| XXXX | XXXX |
| XXXX | XXXX |
| X_RDY$_P$ | XXXX |
| X_RDY$_P$ | XXXX |
| CONT$_P$ | XXXX |
| XXXX | XXXX |
| XXXX | R_RDY$_P$ |
| XXXX | R_RDY$_P$ |
| XXXX | CONT$_P$ |
| SOF$_P$ | XXXX |
| DATA (FIS Type) | XXXX |
| DATA | XXXX |
| DATA | R_IP$_P$ |
| DATA | R_IP$_P$ |
| DATA | CONT$_P$ |
| HOLD$_P$ | XXXX |
| HOLD$_P$ | XXXX |
| CONT$_P$ | XXXX |
| XXXX | XXXX |
| XXXX | HOLDA$_P$ |
| XXXX | HOLDA$_P$ |
| HOLD$_P$ | CONT$_P$ |
| DATA | XXXX |
| DATA | XXXX |
| DATA | XXXX |
| CRC | XXXX |
| EOF$_P$ | R_IP$_P$ |
| WTRM$_P$ | R_IP$_P$ |
| WTRM$_P$ | CONT$_P$ |
| WTRM$_P$ | XXXX |
| CONT$_P$ | XXXX |
| XXXX | R_OK$_P$ |
| XXXX | R_OK$_P$ |
| XXXX | CONT$_P$ |
| XXXX | XXXX |
| SYNC$_P$ | XXXX |
| SYNC$_P$ | XXXX |
| CONT$_P$ | XXXX |
| XXXX | XXXX |
| XXXX | SYNC$_P$ |
| XXXX | SYNC$_P$ |

FIG. 5

| Name | Index |
|---|---|
| P1 | 3.3V Power |
| P2 | 3.3V Power |
| P3 | DEVSLP |
| P4 | GND |
| P5 | GND |
| P6 | GND |
| P7 | 5V Power, Pre-charge |
| P8 | 5V Power |
| P9 | 5V Power |
| P10 | GND |
| P11 | Device Activity Signal, Staggered Spin-up Signal |
| P12 | GND |
| P13 | 12V Power, Pre-charge |
| P14 | 12V Power |
| P15 | 12V Power |

DATA STORAGE SYSTEM AND METHOD ANALYZING NON-SIGNAL

CROSS-REFERENCE TO RELATED APPLICATIONS

A claim of priority under 35 U.S.C. § 119 is made to Korean Patent Application No. 10-2013-0128020 filed Oct. 25, 2013, the subject matter of which is hereby incorporated by reference.

BACKGROUND

The inventive concept relates generally to data storage systems. More particularly, certain embodiments of the inventive concept relate to data storage systems capable of analyzing a non-signal using a protocol analyzer, while other embodiments of the inventive concept relate to non-signal analyzing methods.

Data storage systems come in a myriad of configurations, but generally include a host and a storage device. In this context, a "storage device" may be understood as a semiconductor memory device, an arrangement of multiple semiconductor memory devices, a peripheral device, and the like. The two principal components of a data storage system, the host and storage device, may be electrically connected using a variety of standardized and/or custom interfaces.

Standardized interfaces commonly used to connect contemporary hosts with a variety of storage devices include, the serial ATA (SATA), universal flash storage (UFS), small computer small interface (SCSI), serial attached SCSI (SAS), embedded multimedia (eMMC), universal serial bus (USB) 3.0, FC, UHS-II, Light-peak, and the like. In this context, the term "standardized interface" denotes the hardware used to implement the mechanical and/or electrical interconnections between a host and storage device, and/or at least one data communication protocol that define the commands, instructions, timing, signal exchanges, and data structures enabling a transfer of data between the host and storage device.

The conventionally understood SATA interface may be an advanced ATA interface that enables serial data transmissions between a host and storage device. In many important applications, serial data transmission schemes are preferred over analogous parallel transmission schemes. Thus, the SATA interface may be used to connect a host and storage device in accordance with an established ATA command set and using as few as a single signal line to communicate data, addresses, and/or control signals. In various configurations, the SATA interface enables high-speed data transmission using a relatively high clock frequency.

The SATA interface may be understood as consisting of a data segment and a power segment. The data segment includes one or more signal lines configured to communicate data (hereafter, "data lines") between the host and storage device. The data segment might alternately be referred to as a "signal segment". In one particular configuration, a data segment includes designated TXP, TXN, RXP, and RXN data lines. The power segment includes one or more signal lines configured to communicate power (hereafter, "power lines") between the host and storage device. Power may be provided at various levels, such as, for example, 1.5, 3.0V, and/or 6.0V.

In addition to various power signals, the power segment may be used to communicate a so-called "non-signal". A non-signal might be used, for example to manage power status (e.g., a device sleep, hibernation or power-off signal) for the host and/or storage device. A non-signal might serve as a particular type of data signal or control signal that is communicated outside the data segment of the SATA interface. Non-signal(s) may sometimes be referred to as side signal(s).

SUMMARY

In one embodiment, the inventive concept provides a data storage system including; a host connected to a storage device via a data line and a power line; and a protocol analyzer configured to analyze a signal communicated from the storage device to the host via the data line, wherein the host is configured to communicate a non-signal to the storage device via the power line, upon detecting the non-signal, the storage device is configured to return the non-signal to the host via the data line, and the protocol analyzer is furthered configured to analyze the non-signal returned to the host via the data line and provide analysis results characterizing the returned non-signal.

In another embodiment, the inventive concept provides a non-signal analyzing method for a data storage system including a storage device connected to a host via a data line and a power line. The method includes; communicating a non-signal from the host to the storage device via the power line, detecting the non-signal in the storage device and return the non-signal through to the host via the data line, and analyzing the returned non-signal using a protocol analyzer to generate analysis results characterizing the returned non-signal.

In another embodiment, the inventive concept provides a method of operating a SAT data storage system including a storage device connected to a host via a SAT cable including data lines and power lines. The method includes; using a power line selected from among the power lines to communicate a non-signal from the host to the storage device, detecting the non-signal using a non-signal detector of the storage device, returning the non-signal from the storage device to the host using a data line selected from among the data lines, and analyzing the returned non-signal using a protocol analyzer disposed along the data line to generate analysis results characterizing the returned non-signal.

BRIEF DESCRIPTION OF THE DRAWINGS

The above and other objects and features will become apparent from the following description with reference to the following figures, wherein like reference numerals refer to like parts throughout the various figures unless otherwise specified, and wherein

FIG. 4 is a set of tables illustrating exemplary analysis results provided by the protocol analyzer of FIG. 3;

FIG. 5 is a table listing in one example the nature of signals being communicated by the power lines of FIGS. 2 and 3;

DETAILED DESCRIPTION

Figure 1:
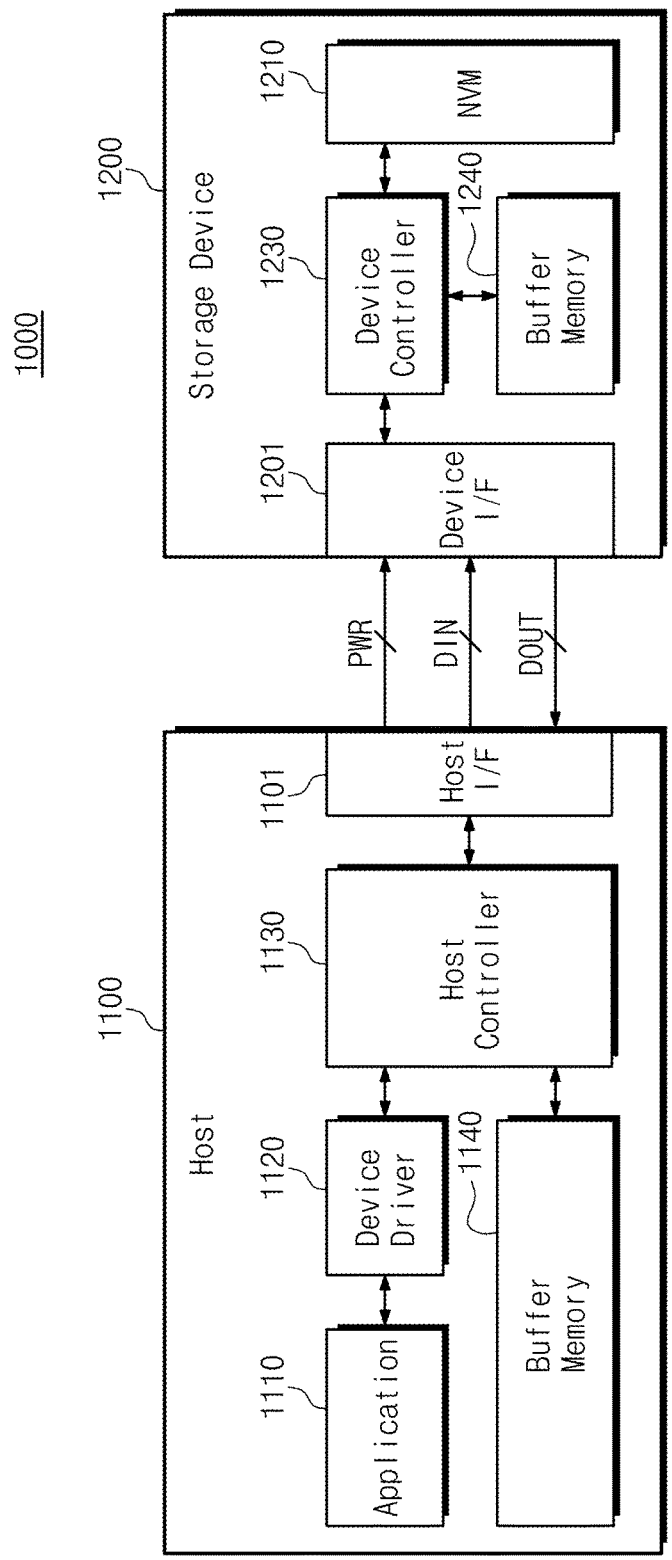
FIG. 1 is a block diagram illustrating a data storage system according to an embodiment of the inventive concept.

Embodiments of the inventive concept will now be described in some additional detail with reference to the accompanying drawings. The inventive concept may, however, be embodied in many different forms and should not be construed as being limited to only the illustrated embodiments. Rather, these embodiments are provided as examples so that this disclosure will be thorough and complete, and will fully convey the concept of the inventive concept to those skilled in the art. Unless otherwise noted, like reference numbers and labels are used to denote like or similar elements throughout the drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a storage system according to an embodiment of the inventive concepts. Referring to FIG. 1, a storage system 1000 comprises a host 1100 and a storage device 1200. The host 1100 includes a host interface 1101 configured to facilitate the exchange of data with the storage device 1200 which includes a device interface 1201.

In the embodiment of FIG. 1, the host interface 1101 and device interface 1201 are connected via data lines DIN and DOUT that exchange data and/or related address, controls signals, and a power line PWR that provides a power supply voltage to the storage device 1200. The host interface 1101 and device interface 1201 may thus communicate via a high-speed serial interface implemented according to one of the standardized interfaces noted above.

The host 1100 includes in relevant part an application 1110, a device driver 1120, a host controller 1130, and a buffer memory 1140. The application 1110 may be one of various application programs capable of being executed by the host 1100. The device driver 1120 may be used to drive operation of the storage device 1200. In certain embodiments of the inventive concept, the application 1110 and/or device driver 1120, wholly or in respective parts, may be implemented using hardware, software, and/or firmware.

The host controller 1130 may be used to control the overall operation of the host 1100. In operation, the host controller 1130 provides the storage device 1200 with data stored (e.g.,) in the buffer memory 1140 via the host interface 1101 in response to a write request issued by the device driver 1120. Alternately, upon receiving a read request, the host controller 1130 may provide a read command via the host interface 1101 to the storage device 1200, and thereafter receive data retrieved from the storage device 1200.

The buffer memory 1140 may be used as a main memory or a cache memory within the host 1100, or as a memory for temporarily storing data to be provided to the storage device 1200. The buffer memory 1140 may also be used as a driving memory for driving software such as the application 1110 and/or device driver 1120.

The storage device 1200 is connected via the device interface 1201 to the host 1100, and comprises in relevant part; a nonvolatile memory 1210, a device controller 1230, and a buffer memory 1240.

The nonvolatile memory 1210 may include a flash memory, MRAM, PRAM, FeRAM, etc. The device controller 1230 may be used to control the overall operation of the nonvolatile memory 1210 during (e.g.,) write, read and erase operation(s), etc. The device controller 1230 may be used to exchange data via an address and/or data bus with the nonvolatile memory 1210 or the buffer memory 1240.

The buffer memory 1240 may be used to temporarily store data retrieved from, or to be stored in the nonvolatile memory 1210. The buffer memory 1240 may be implemented using a volatile memory and/or a nonvolatile memory.

Figure 2:
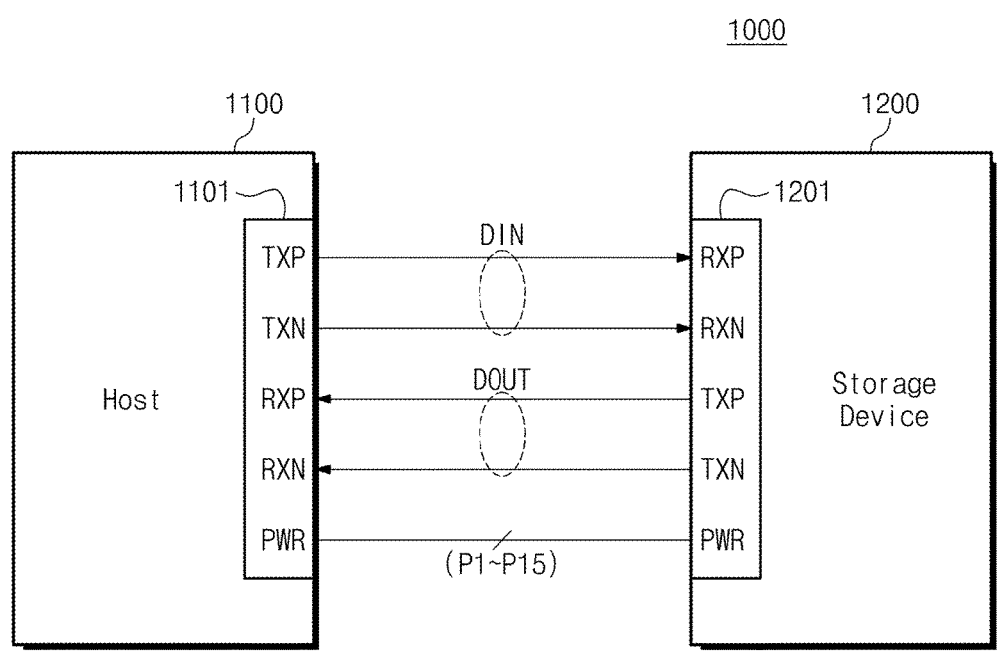
FIG. 2 is a block diagram further illustrating in one example an interface for the data storage system of FIG. 1.

FIG. 2 is a block diagram further illustrating in one example an interface for the data storage system of FIG. 1.

In FIG. 2, a SATA interface is assumed as an example. That is, the host interface 1101 and device interface 1201 of FIG. 1 are assumed to be connected via a SATA cable including a data segment and a power segment.

Here, the data segment is assumed to include two (2) unidirectional data line pairs, DIN and DOUT. DIN is used to provide data from the host 1100 to the storage device 1200. DOUT is used to provide data from the storage device 1200 to the host 1100. As will be appreciated by those skilled in the art, the data lines implementing DIN and DOUT will be connected between respective transmission (TX) terminals and receiving (RX) terminals (e.g., TXP, TXN, RXP, and RXN terminals) of the host 1100 and storage device 1200.

The power segment assumed in the example of FIG. 2 includes fifteen (15) power lines (e.g., P1 to P15). The power segment may be connected to various power terminals (PWR) of the host 1100 and storage device 1200, and may be respectively used to communicate various power and/or controls signals. Hereafter, power signal(s) and control signal(s) communicated via the power segment will be referred to as non-signal(s). Hence, "non-signals" of various type that are communicated via the power segment may be distinguished from "signals" of various type communicated via the data (or signal) segment.

Figure 3:
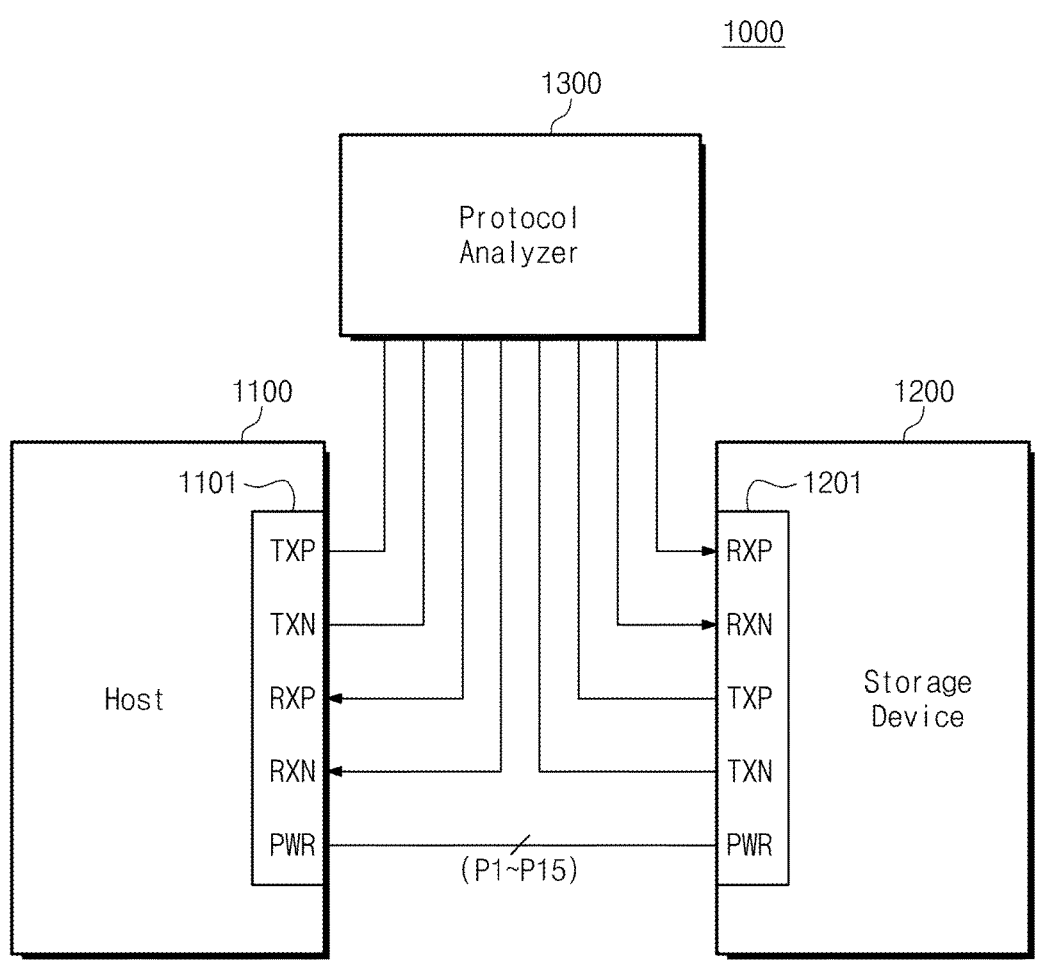
FIG. 3 is a block diagram illustrating the incorporation of a protocol analyzer configured to analyze certain signal(s) being communicated within the data storage system of FIG. 2.

FIG. 3 is a block diagram illustrating the incorporation of a protocol analyzer 1300 configured to analyze various signals communicated by the data segment of the data storage system of FIG. 2 between the host 1100 and storage device 1200.

The protocol analyzer 1300 may be disposed along the data lines connecting respective TX terminals and corresponding RX terminals of the host 1100 and storage device 1200. Thus, as shown in FIG. 3, the data lines DIN and DOUT may essentially connect the protocol analyzer 1300 between the host 1100 and storage device 1200.

The protocol analyzer 1300 may take many different forms, but will be capable of analyzing the various signals communicated via the data segment e.g., TXP, TXN, RXP, and RXN. For example, the protocol analyzer 1300 may be used to analyze "write data" to be written to the storage device 120 and provided by the host 1100, or "read data" retrieved from the storage device 1200 and communicated to the host 1100. Alternately or additionally, the protocol analyzer 1300 may be used for debugging purposes, such as for example, making a determination as to whether or not data is being properly exchanged between the host 1100 and storage device 1200. This is potentially a significant capability, since conventional serial interfaces like SATA that utilize encoding techniques, such as SERDES or LVDS, may not be able to directly analyze (i.e., in and of itself determine the meaning of, or the operational appropriateness of) a particular signal being communicated by the data segment of a data storage system. In contrast, the protocol analyzer 1300 will be able to directly analyze a signal and determine what a particular signal is and whether it is appropriate. Thus, in the context of a defined signal being communicated by the data segment of a data storage system, the protocol analyzer 1300 provided by embodiments of the inventive concept will be able to determine whether a normal signal transmission has occurred. Here, the term "normal" denotes the presence of a signal having certain signal characteristic(s) (e.g., voltage level, timing, etc.) that fall within signal specification(s) provided by (or appropriate to) a protocol being implemented by the host I/F 1101 and device I/F 1201 of the data storage system 1000.

FIG. 4 is a set of tables illustrating in one example a signal analyzing result provided by the protocol analyzer 1300 of FIG. 3. Here, it is assumed that the protocol analyzer 1300 is used to decode a signal being transferred by the data segment of the data storage system 1000 of FIG. 3. The example illustrated in FIG. 4 assumes a SATA protocol at a link level.

In the context of contemporary data storage systems like the one illustrated in FIG. 1, there is an increasing need to conserve power. Hence, one or more "low power operating modes" have been defined wherein power consumption is reduced in comparison with certain operating modes providing fuller operational capabilities for a data storage system. Many different low power operating modes and corresponding names have been proposed. For example, one defined low power operating mode is the so-called device sleep (or DEVSLP) mode that markedly reduces the power consumed by a data storage device. Another defined low power operating mode is the so-called power blocking (or RTD3) mode that selectively blocks power to one or more components of a data storage device for a defined period of time.

Certain control signals (or commands) have been used to indicate the initiation or termination of low power operating modes. However, according to certain embodiments of the inventive concept, such control signals or commands (e.g., DEVSLP or RTD3) designated as non-signals and communicated between a host and storage device using the power (or non-signal) segment rather than the data (or signal) segment may nonetheless be moved to a data line and thereby analyzed by the protocol analyzer 1300. For example, assuming the use of a SATA interface in a data storage system according to an embodiment of the inventive concept, entrance into a device sleep mode (DEVSLP) may be indicated using a non-signal communicated via a power line or an impaired signal line deemed unfit for use as a data line. Such a non-signal could not be analyzed by conventional techniques that provide a protocol analyzer only with respect to signals communicated via data lines. However, data storage systems according to embodiments of the inventive concept are able to monitor and analyze certain non-signals communicated via the power segment of a data storage system.

FIG. 5 is a table listing in one example the nature of signals being communicated via the power lines of FIGS. 2 and 3. Referring to FIG. 5, the use of a particular power cable compatible with a SATA interface is assumed. the power cable include fifteen (15) power lines capable of respectively providing power signals, control signals, and perhaps other forms of non-signals.

Thus, power lines P1, P2, P4, P5, P6, P7, P8, P9 P10, P12, P13, P14 and P15 are designated to supply various DC power signals (e.g., 3.3V, 12.0V, and ground). In contrast, power lines P3 and P11 are designated to respectively supply certain non-signals (e.g., DEVSLP, and a "device activity signal" or a "staggered spin-up signal").

Here, the device activity signal may be activate during periods wherein data is being communicated from the host interface 1101 to a device interface 1201. Alternately, when a number of device interfaces 1201 are connected to the host interface 1101, and the storage device 1200 is a hard disk drive (HDD), the "staggered spin-up signal" may serve as a spin-up signal indicating a spinning up of storage devices on a stage-by-stage basis. Thus, the staggered spin-up signal may be activated upon power-up of the storage device 1200. The DEVSLP signal has been previously touched upon, and is a non-signal enabling the host interface 1101 and device interface 1201 to operate in a low power operating mode.

Figure 6:
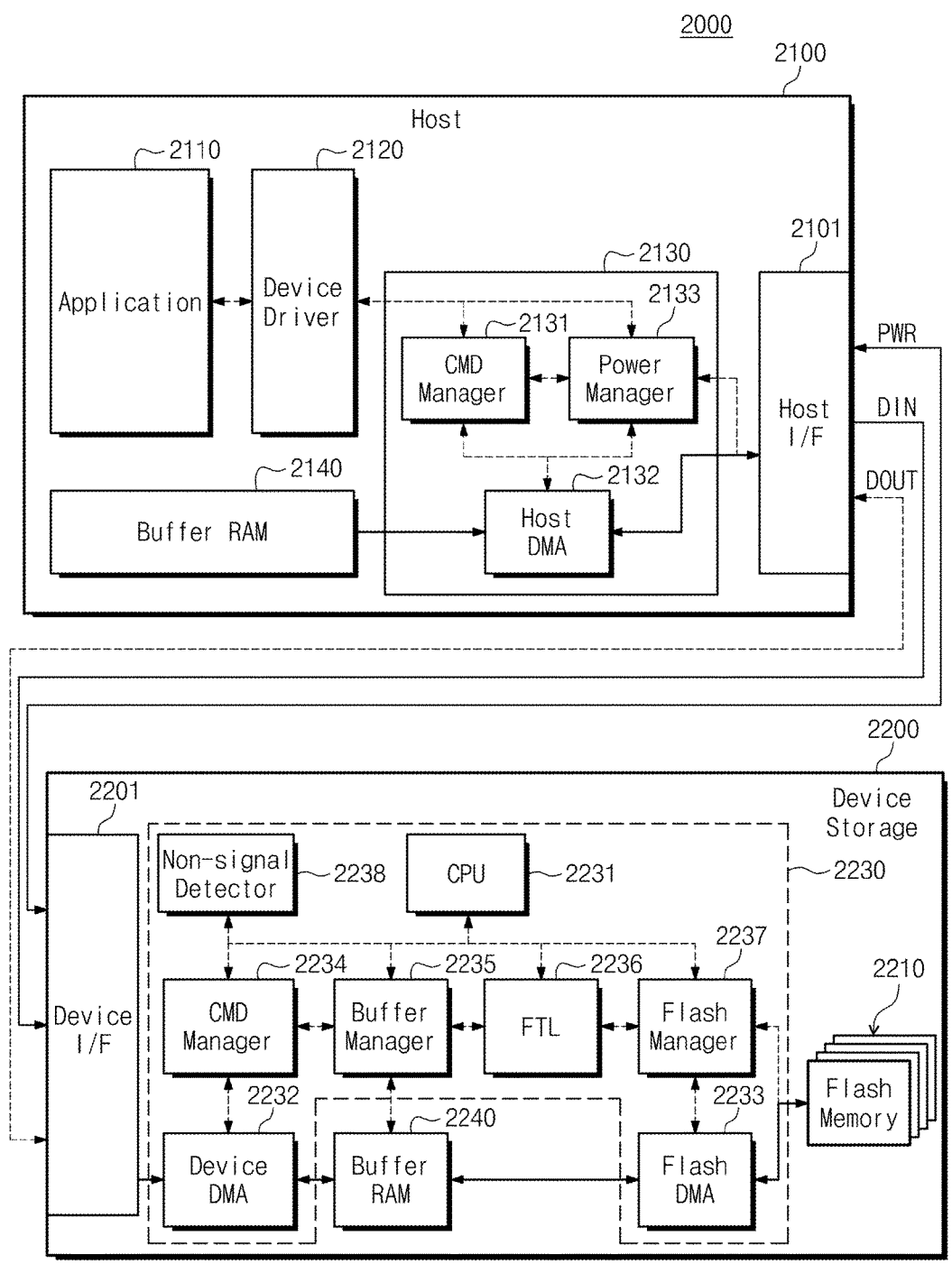
FIG. 6 is a block diagram illustrating a data storage system according to another embodiment of the inventive concept.

FIG. 6 is a block diagram illustrating a data storage system according to another embodiment of the inventive concepts. Referring to FIG. 6, a data storage system 2000 comprises a host 2100 and a storage device 2200.

The host 2100 comprises an application 2110, a device driver 2120, a host controller 2130, and buffer RAM 2140. The host controller 2130 comprises a command manager 2131, a host direct memory access (DMA) 2232, and a power manager 2133.

In operation, a system level command (e.g., a write command) is generated by the application 2110 and device driver 2120 of the host 2100 and is then provided to the command manager 2131 of the host controller 2130. The command manager 2131 may be used to generate a corresponding storage device command (i.e., a corresponding command or set of commands consistent with a protocol being implemented by the data storage system 2000) that is provided to the storage device 2200 using the device driver 2120. The command generated by the command manager 2131 may also be provided to the host DMA 2132 which sends the command to the storage device 2200 via the host interface 2101.

The storage device 2200 comprises a flash memory 2210, a device controller 2230, and a buffer random access memory (RAM) 2240. The device controller 2230 may include a Central Processing Unit (CPU) 2231, a device DMA 2232, a flash DMA 2233, a command manager 2234, a buffer manager 2235, a flash translation layer (FTL) 2236, a flash manager 2237, and a non-signal detector 2238.

A command transferred from the host 2100 to storage device 2200 may be provided to the device DMA 2232 via the device interface 2201. The device DMA 2232 may then communicate the received command to the command manager 2234. The command manager 2234 may be used to allocate memory space in the buffer RAM 2240 in order to receive corresponding write data via the buffer manager 2235. Once the storage device 2200 is read to receive the write data, the command manager 2234 may communicate a transmission "ready" signal to the host 2100.

Upon receiving the transmission ready signal, the host 2100 will communicate the write data to the storage device 2200. The write data may be sent to the storage device 2200 using the host DMA 2132 and host interface 2101. The storage device 2200 may then store the received write data in the buffer RAM 2240 using the device DMA 2232 and buffer manager 2235. The write data stored in the buffer RAM 2240 may then be provided to the flash manger 2237 via the flash DMA 2233. The flash manager 2237 may be used to program the write data according to addresses for the flash memory 2210 derived from an address mapping table by the flash translation layer 2236.

Once the transfer and programming of the write data is complete, the storage device 2200 may send a response to the host 2100 informing the host 2100 that the write command has been successfully executed. Based on the received response signal, the host 2100 indicate to the device driver 2120 and application 2110 that the command is complete, and will thereafter terminate execution of the operation corresponding to the command.

As described above, the host 2100 and storage device 2200 may exchange data, corresponding commands and/or control signal(s) (e.g., the ready and response signals) via data lines of the data segment (e.g., data lines DIN and DOUT). And as noted above, some or all of the signals exchanged via the data segment of the data storage device 2000 may be effectively analyzed using the protocol analyzer 1300 shown in FIG. 3.

However, consistent with the inventive concept, the exemplary storage system 2000 of FIG. 6 may also analyze non-signals that are communicated outside the data segment (e.g., via the power segment). In order to accomplish this, the storage device 2200 of FIG. 6 comprises the non-signal detector 2238 that is configured to detect certain non-signals communicated from the host 2100 via a power line of the power segment. Upon detection a non-signal may be transferred (or "returned") from the data storage device 2200 to the host 2100 using a data line of the data segment. In this manner, the returned non-signal may be processed through the protocol analyzer 1300 of FIG. 3 and analyzed like any other signal being communicated from the storage device 2200 to the host 2100 via a data line. Accordingly, analysis results for the returned non-signal may be readily obtained.

Figure 7:
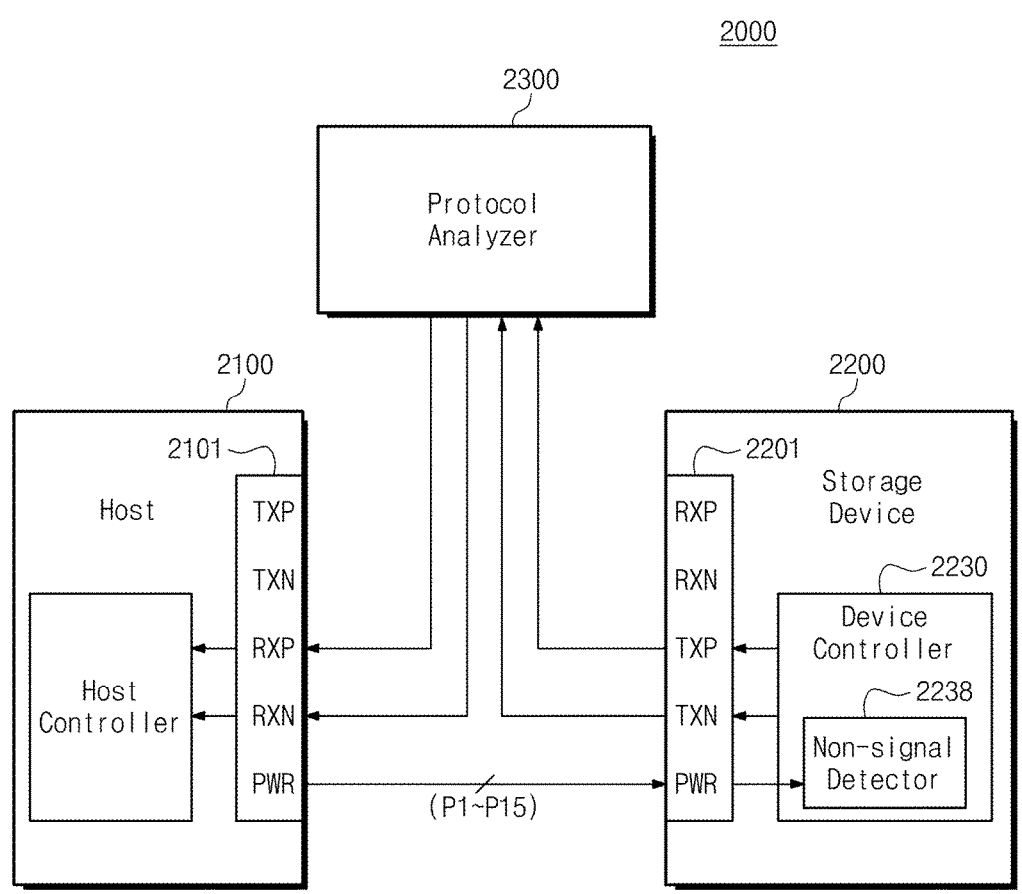
FIG. 7 is a block diagram illustrating a SATA data storage system capable of operating in accordance with the SATA interface example of FIG. 6.

FIG. 7 is a block diagram illustrating a SATA storage system using a SATA interface as one more particular example of the data storage system 2000 of FIG. 6. Referring to FIG. 7, a SATA storage system 2000 includes the host 2100, storage device 2200, and a protocol analyzer 2300. As before, the host 2100 includes a host interface 2101 and a host controller 2130, and the storage device 2200 includes a device interface 2201 and a device controller 2230.

In the illustrated example of FIG. 7, the device controller 2230 includes a non-signal detector 2238, where the non-signal detector 2238 is functionally connected to one or more of a number of power lines connecting the host 2100 to the storage device 2200. Hence, the non-signal detector 2238 may be sued to detect a non-signal received via a power line, and may then be used to return-communicate the detected non-signal to the host 2100 via a selected data line (e.g., a TXP/TXN terminal).

The non-signal detector 2238 may be implemented using hardware and/or software. When implemented wholly or in part using software, the code functionally implementing the non-signal detector 2238 may be stored in one of the memories associated with the storage device 2200 (e.g., the buffer RAM 2240 or the flash memory 2210). And while the non-signal detector 2238 of FIG. 7 is shown as being part of the device controller 2230 in certain embodiments of the inventive concept, this component might alternately be provided external to the device controller 2230 as part of storage device 2230, or even external to, but operatively associated with the storage device 2230.

The protocol analyzer 2300 of FIG. 7 is connected between TXP/TXN terminals of the device interface 2201 and RXP/RXN terminals of the host interface 2101. Alternating, the protocol analyzer 2300 might be connected between TXP/TXN terminals of the host interface 2101 and RXP/RXN terminals of the device interface 2201.

However specifically configured in relation to one or more data lines of the data segment, the protocol analyzer 2300 may be used to analyze signal(s) routinely communicated between the storage device 2200 and the host 2100 via one or more data lines, and to analyze a returned non-signal communicated from the storage device 2200 to the host 210 via one or more of the data lines. In this manner, the analytical benefits provided by the protocol analyzer 2300 may be extended from signals to non-signals that are returned to the host 2100.

Figure 8:
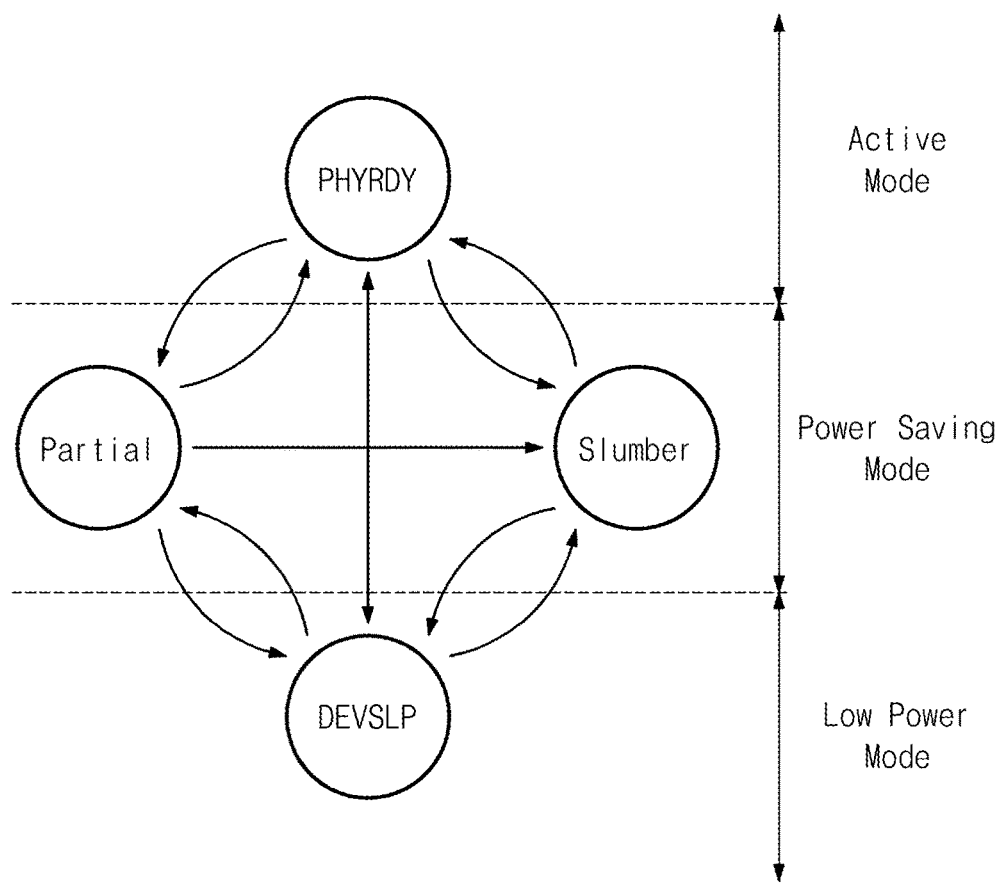
FIG. 8 is a state diagram illustrating a plurality of power states that may be sued to manage power consumption by the SATA storage system of FIG. 7.

As has previously been suggested, the control signals used to indicate operational transitions to (and between) certain power-related operating modes are ready examples of non-signals used by data storage devices. Thus, FIG. 8 is provided as state transition diagram illustrating a number of power-related operating modes including (e.g.,) active, power saving, and low power modes. This group of operating modes may be used to effective manage power consumption for a SATA storage system, like the one shown in FIG. 7.

Referring to FIGS. 7 and 8, the SATA storage system 2000 includes a physical layer ready mode (PHYRDY) as active operating mode, as well as a partial (Partial) operating mode, a slumber (Slumber) operating mode, and the device sleep (DEVSLP) mode. The Partial/Slumber modes consume less power than the PHYRDY mode, but more than the PHYRDY mode. For example, it may be assumed that when the data storage system 200 is operating in the PHYRDY mode, all blocks of system's physical layer(s) are activated. In contrast, when the data storage system 200 is operating in either of the Partial or Slumber modes, it is assumed that the SATA interface is not activated in order to conserve power over the PHYRDY operating mode.

Here, the Partial and Slumber operating modes may be different in relation to respective wake-up times required to transition to the PHYRDY operating mode. For example, a first wake-up time for the Partial mode may be less than or equal to 10 us, while a second wake-up time for the Slumber mode may be greater than 10 ms. That is, in certain embodiments of the inventive concept, power may not be applied to certain physical blocks associated with the transmission/reception of data during the Partial operating mode, and may not be applied to certain additional physical blocks during the Slumber mode (e.g., the squelch circuit). Hence, the first wake-up time will be less than the second wake-up time, allowing for a faster transition from the Partial operating mode to the PHYRDY operating mode, as compared with the Slumber operating mode.

During the device sleep operating mode (DEVSLP) provided in relation to certain embodiments of the inventive concept, data transmission/reception functions between the host 2100 and storage device 2200 are entirely halted. Accordingly, the storage device 2200 need only supply power to physical blocks operative during the device sleep operating mode, as indicated by the DEVSLP signal, and may omit power application from other physical blocks relevant to only the transmission/reception of data signals. In similar manner, the host 2100 need not apply power to (e.g.,) the host interface 2101 while the storage device 2200 remains in the device sleep operating mode.

As previously assumed, a DEVSLP signal may be a particular control signal used to indicate transitions by the data storage system into and out of the device sleep operating mode. This type of control signal may be effectively provided using a sideband signaling technique via a power line of the power segment. That is, assuming the storage system 2200 is presently in the device sleep mode, any subsequent communication of the DEVSLP signal while the storage device 2200 is in the device sleep operating mode might be interpreted as an Out-of-Band (OOB) signal, and the storage device 2200 may enter a ready state in response to the OOB signal.

In certain data storage systems, the Partial mode and Slumber mode must be passed through between the PHYRDY mode and the DEVSLP mode. And while this saves a great deal of power in a data storage system using a SATA interface, it also requires a great deal of time. However, in contrast, certain embodiments of the inventive concepts may be implemented and operated in such a manner that transitions between the DEVSLP mode and PHYRDY mode may be immediately accomplished, thereby markedly reducing the amount of time required to enter (e.g.,) the PHYRDY mode from the DEVSLP mode.

Figure 9:
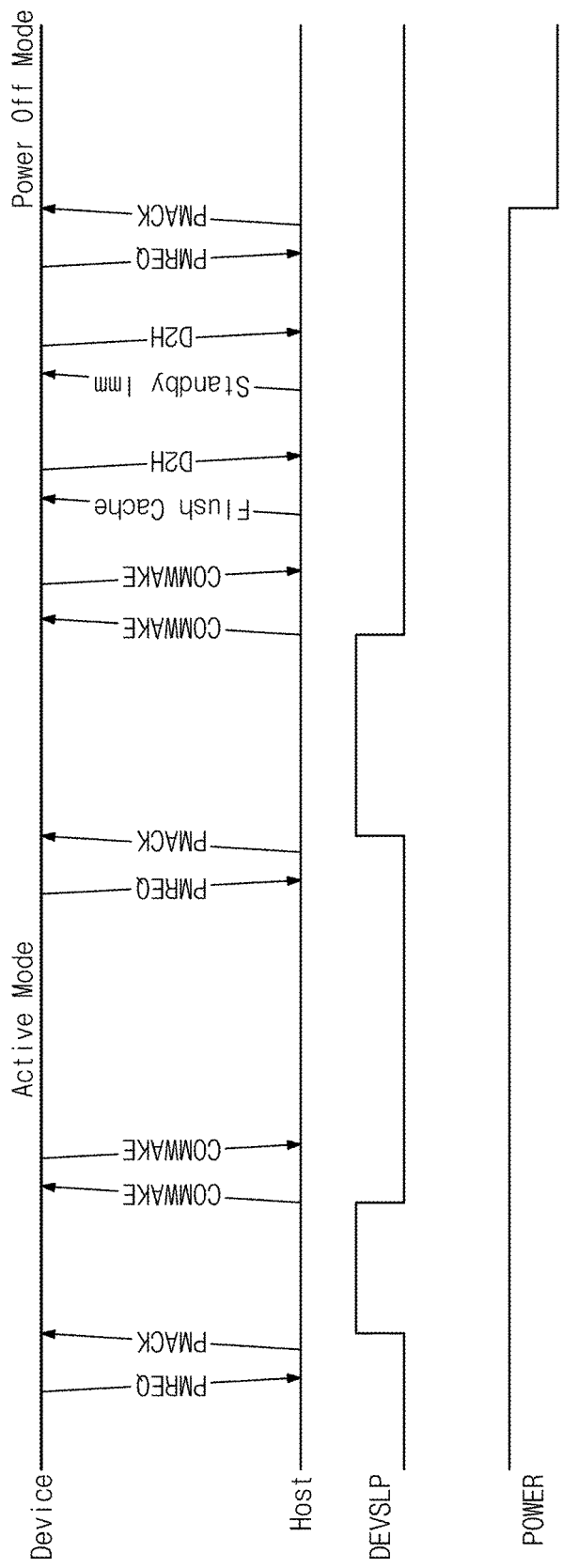
FIGS. 9 and 10 are respective conceptual diagrams illustrating certain exemplary signal exchanges between a host and storage device using the power segment of the SATA storage system of FIG. 7.

FIG. 9 is a conceptual diagram illustrating operation of a data storage system in which signals are exchanged between a host and storage device using a SATA interface like the one shown in FIG. 7. FIG. 9 shows an example in which the operating mode of a SATA data storage system transitions when a non-signal detector 2238 shown in FIG. 7 is not provided. Here, the SATA interface is assumed to support an initiate power management (IPM) function as a method of managing power consumption, where the IPM function is divided into host initiate power management (HIPM) and device initiate power management (DIPM) sub-functions.

The HIPM may be used to indicate transition between power states for the host interface 2101 and device interface 2201 upon request by the host interface 2101. The DIPM may be used to indicate transition between power states for the host interface 2101 and device interface 2201 upon request by the device interface 2201. FIG. 9 illustrates a case where the power state of the SATA interface transitions in response to the DIPM.

Referring to FIG. 9, in order to operate in the DEVSLP mode, the storage device 2200 may send a signal PMREQ requesting a transition to the DEVSLP mode by the host 2100. Upon receiving the PMREQ signal, the host 2100 may return a PMACK signal to the storage device 2200 as a response signal, where the PMACK signal indicate that the host 2100 is able to enter the DEVSLP mode.

Now, the host 2100 is assumed to provide the DEVSLP signal via a power line (e.g., P3 shown in FIG. 5), and the host interface 2101 and device interface 2201 enter the DEVSLP mode. Given these assumptions, if the SATA interface wishes to enter operate the PHYRDY mode from the DEVSLP mode, a request signal COMWAKE must be sent.

Thus as shown by way of a particular example in FIG. 9, the host 2100 may send a request signal COMWAKE to the storage device 2200 that is currently in the DVESLP mode. Here, the SATA interface portion of the host 2100 may communicate the request signal COMWAKE by first transitioning to the PHYRD mode and then communicating the request signal COMWAKE. In this manner, first the host interface 2101 and then the device interface 2201 may be made to transition from the DEVSLP mode to the PHYRDY mode.

As further illustrated in FIG. 9, the storage device 2200 may provide the host 2100 with a signal PMREQ requesting transition to a power-off mode, and the host 2100 may send a signal PMACK to the storage device 2200 as a response signal. If the host 2100 provides the power-off signal via a power line of the power segment, the host interface 2101 and device interface 2201 may both be made to transition to the power-off state.

Certain non-signals such as the DEVSLP signal or a Power Off signal indicating the power-off state may be communicated via the power (or non-signal) segment of the data storage system 200, rather than the data (or signal) segment. Thus, if the non-signal detector 2238 of the SATA storage system 2000 is not provided, the protocol analyzer 2300 will not be able to analyze such non-signals. That is, the SATA data storage system 2000 will not be able to determine whether or not certain non-signals have been normally communicated and received.

Figure 10:
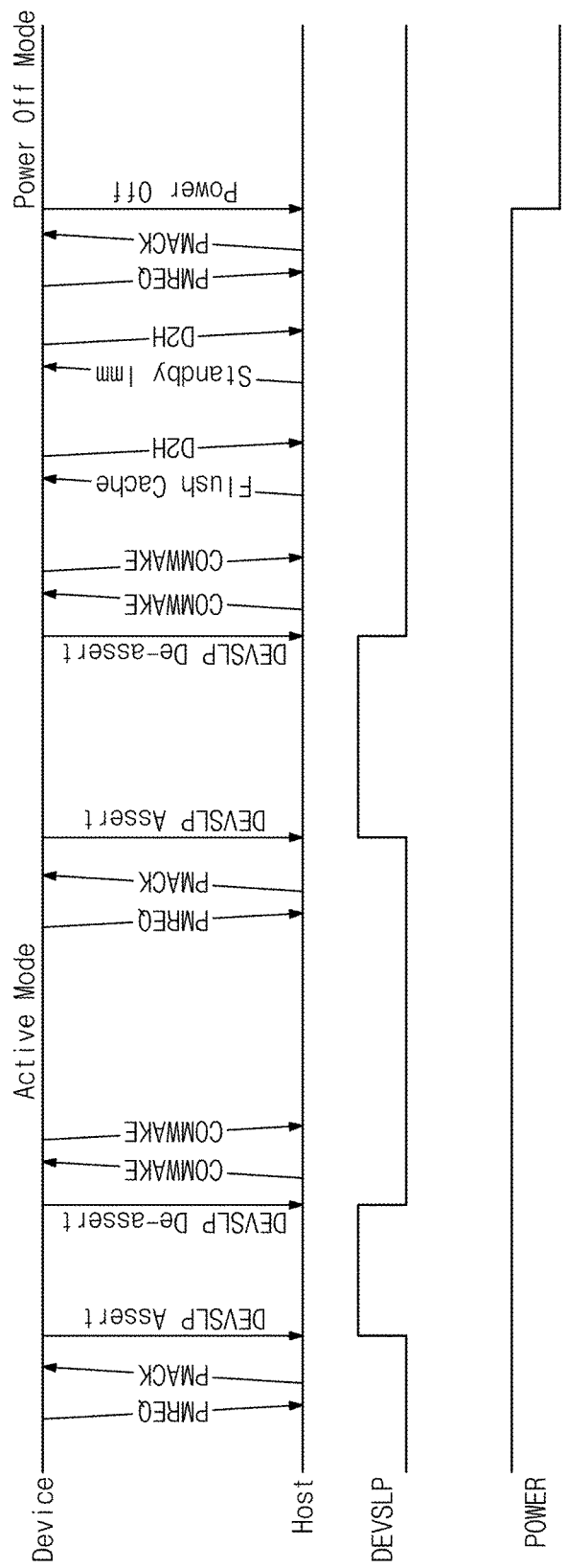

By way of comparison, FIG. 10 is another conceptual diagram illustrating data storage system operation in which the power mode of a SATA interface transitions in response to certain non-signal(s) that are detected by the non-signal detector 2238 of FIG. 7. Here, the SATA storage system 2000 according to embodiments of the inventive concepts is fully capable of analyzing a non-signal using the protocol analyzer 2300, despite the fact that it has been communicated from the host 2100 to the storage device 2200 via a power segment.

Referring to FIG. 10, the storage device 2200 is assumed to send to the host 2100 a PMREQ requesting transition to the DEVSLP mode, and the host 2100 returns a signal PMACK to the storage device 2200 as a response signal. It is further assumed that the host 2100 provides the corresponding DEVSLP signal via a power line (e.g., P3 shown in FIG. 5) of the power segment. Accordingly, the DEVSLP signal may be detected by the non-signal detector 2238 as a non-signal received via a power line.

The non-signal detector 2238 then return the detected non-signal (e.g., DEVSLP Assert) to the host 2100 via (e.g.,) the TXP/TXN terminal. During this return communication, the protocol analyzer 2300 may be used to monitor and analyze the non-signal (e.g., DEVSLP). The analysis results may then be used to indicate whether or not the detected non-signal is normal, and/or whether the non-signal has been normally transferred according to the implemented protocol. The host interface 2101 and device interface 2201 may thereafter be configured to operate in the DEVSLP mode in response to the received signal DEVSLP signal.

As illustrated in FIG. 10, if the signal DEVSLP transitions from logical "high" to "low", the non-signal detector 2238 will transfer the DEVSLP De-assert to the host 2100 via (e.g.,) the TXP/TXN terminal. At this time, the protocol analyzer 2300 may be used to analyze the returned non-signal (e.g., DEVSLP De-assert) that is communicated via a data line of the data segment. Meanwhile, the host 2100 may transfer a request signal COMWAKE in order to exit the DEVSLP mode.

Referring to FIG. 10, the storage device 2200 may transfer the signal PMREQ requesting a transition to the power-off mode to the host 2100, and the host 2100 may transfer the signal PMACK to the storage device 2200 as a response signal. If the power-off signal transitions from high to low, the non-signal detector 2238 will send a Power Off to the host 2100 via (e.g.,) the TXP/TXN terminal. At this time, the protocol analyzer 2300 may be used to analyze the non-signal (e.g., Power Off) communicated via the data line of the data segment.

Thus, non-signals such as DEVSLP and Power Off may thus be communicated via a power (or non-signal) segment and yet be effectively analyzed by a protocol analyzer disposed in the constituent data storage system.

Figure 11:
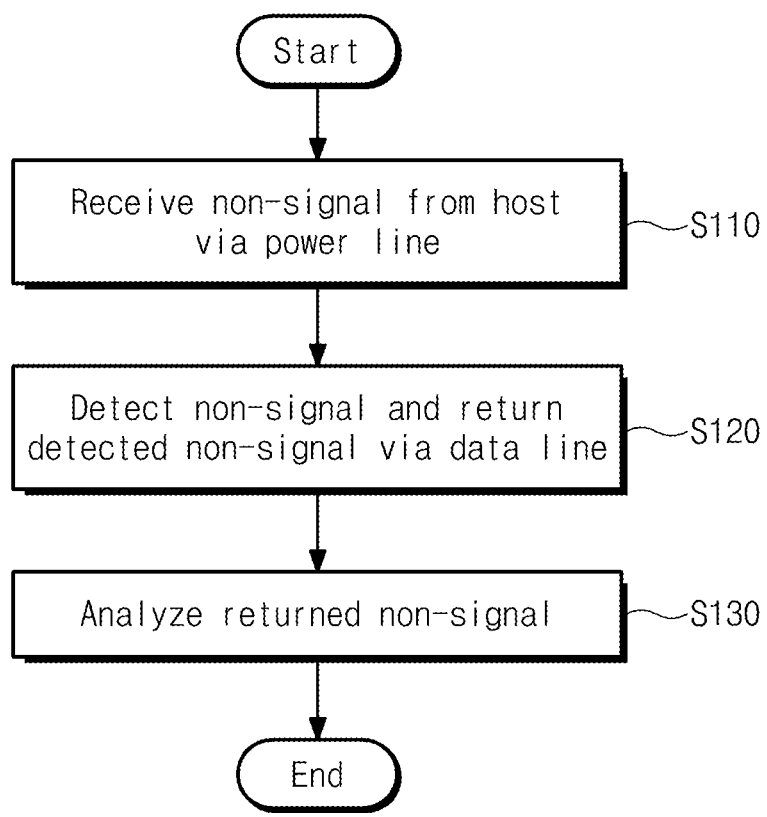
FIG. 11 is a flow chart summarizing in one example a non-signal analyzing method that may be used by the SATA storage system of FIG. 7.

FIG. 11 is a flow chart summarizing in one example a non-signal analyzing method for a SATA data storage system, like the one shown in FIG. 7.

The method receives a non-signal communicated from a host to a storage device using a power line of a power segment (S110). Then, the storage device 2200 detects the received non-signal, and returns the detected non-signal to the host via a data line connected through a protocol analyzer (S120). In this manner, the protocol analyzer may analyze the returned non-signal communicated via the data line and provide corresponding analysis results (i.e., non-signal operation information) to (e.g.,) the host, or a user of the data storage system (S130). Here, the non-signal operation information may include information regarding the start and end of the non-signal operation, for example.

Figure 12:
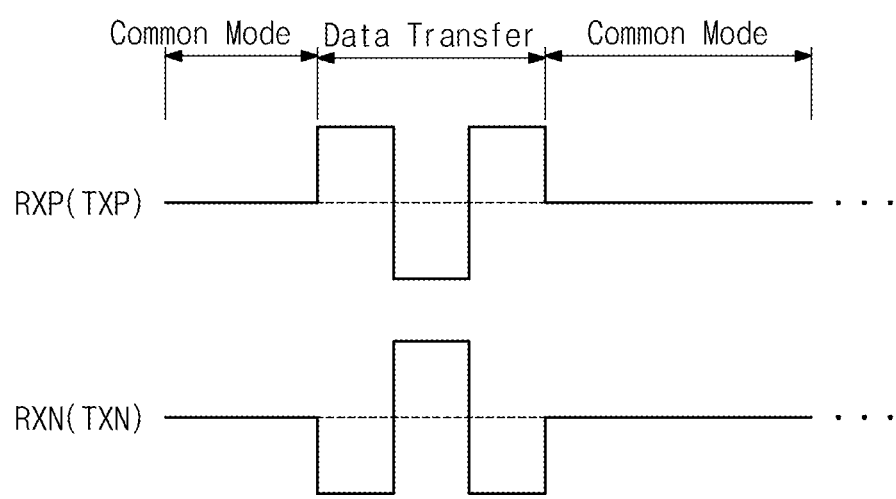
FIG. 12 is a timing diagram illustrating a differential signal transfer method for the SATA storage system of FIG. 7.

FIG. 12 is a timing diagram illustrating a differential signal transfer method that may be used by the SATA storage system of FIG. 7.

During a SATA interface, a data transfer may be performed using low voltage differential signaling (LVDS) techniques. With use of LVDS techniques, a data value may be expressed as a difference between two (2) signals (e.g., RXP and RXN signals or TXP and TXN signals) transferred via data line(s). LVDS techniques may be particularly useful when signal amplitudes are small, thereby improving switching speed for data transmission while conserving power.

As shown in FIG. 12, with use of LVDS, each of the two signals may maintain an intermediate logical state (e.g., a floating state) during periods where data is not being communicated. That is, the two signals may have a common mode voltage level during periods during which data is not being communicated.

Figure 13:
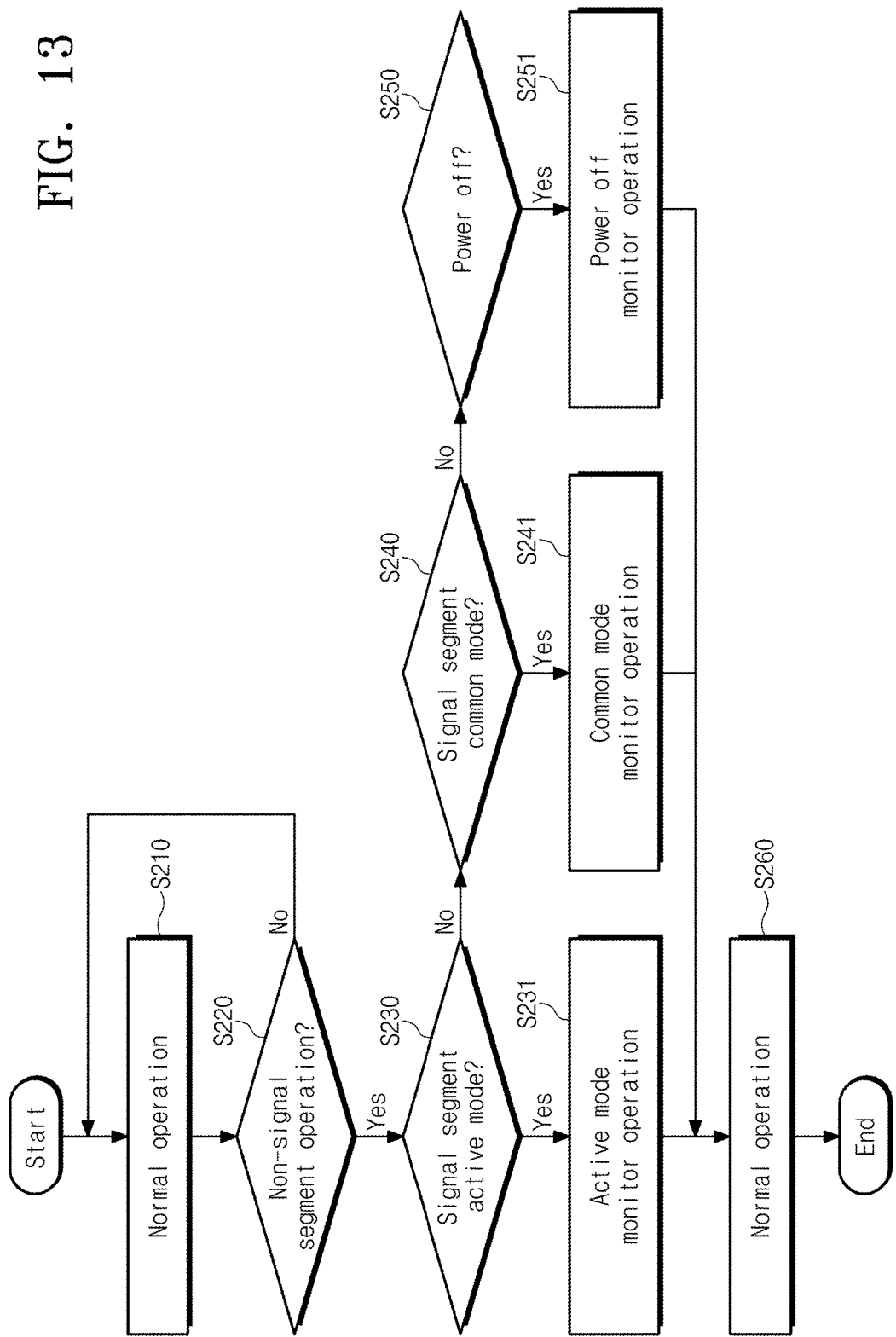
FIG. 13 is a flow chart summarizing in another example a method of operating the SATA storage system of FIG. 7.

FIG. 13 is a flow chart summarizing in another example an operating method for a SATA data storage system, like the one shown in FIG. 7. The SATA storage system 2000 is able to qualitatively analyze signals communicated by a signal segment and a power segment using the non-signal detector 2238 and protocol analyzer 2300. For example, the SATA storage system 2000 may detect an active mode, a common mode, and power-off state.

In the operating method, the SATA storage system 2000 performs normal operations (S210) until a non-signal segment operation is detected (S220=Yes). That is, the SATA storage system 2000 determines whether or not a non-signal segment operation is performed using the non-signal detector 2238 and the protocol analyzer 2300.

As a consequence of determining that the non-signal segment operation is not performed (S220=No), the SATA storage system 2000 may perform various operations in which signal segment operation(s) and a non-signal segment operation(s) are checked and a corresponding mode detected.

However, upon determining that a non-signal segment operation has occurred (S220=Yes), a next determination is made as to whether an active mode of a signal segment is performed (S230). As a consequence of determining that the active mode of the signal segment is performed (S230=Yes), the SATA storage system 2000 monitors the active mode operation (S231). During the active mode monitor operation, the SATA storage system 2000 may determine whether the SATA link protocol is being maintained in an acceptable range. For example, particular information may be provided by increasing the number of ALIGNs inserted every 256DW or controlling the number of SYNCs.

As a consequence of determining that the active mode of the signal segment is not performed (S230=No), a next determination is made as to whether a common mode of the signal segment is performed (S240). As a consequence of determining that the common mode of the signal segment is performed (S240=Yes), the SATA storage system 2000 will monitor the common mode operation (S241).

During the common mode monitor operation, the SATA storage system 2000 may provide information via the protocol analyzer 2300 by controlling TXN and TXP within a range where a SATA OOB protocol is maintained. In particular, it is possible to insert additional information (e.g., a power, a time parameter, etc.) using a period Must not Detect and a period Burst or Gap.

As a consequence of determining that the common mode of the signal segment is not performed (S240=No), a next determination is made as to whether a power-off mode is performed (S250). As a consequence of determining that the power-off mode is performed, the SATA storage system 2000 may monitor a power-off operation (S251). The SATA storage system 2000 may check Power Off to transmit a small OOB signal in which Burst and Gap periods are adjusted, to inform Power Off through a transfer of an unrecognizable particular signal, or to insert a time associated with Power Off or additional information.

After one of the active mode monitor operation (S231), common mode monitor operation (S241), or power-off monitor operation (S251) is performed, the SATA storage system 2000 may again return to normal operations (S260).

A data storage system according to embodiments of the inventive concept includes a host and storage device. The storage device may include a nonvolatile memory and a device controller. The nonvolatile memory and the device controller may be integrated in a semiconductor device to form a PCMCIA (personal computer memory card international association) card, a CF (compact flash) card, a smart media card, a memory stick, a multimedia card (e.g., MMC, RS-MMC, MMC-micro, etc.), an SD (secure digital) card (e.g., SD, Mini-SD, Micro-SD, SDHC, etc.), UFS (universal flash storage), etc.

Also, the nonvolatile memory and the device controller may be applied to a solid state drive (SSD), a portable computer, a ultra-mobile personal computer (UMPC), a workstation, a net-book, a personal digital assistance (PDA), a web tablet, a wireless phone, a mobile phone, a smart phone, a smart television, a three-dimensional television, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, a device for transmitting and receiving information in a wireless environment, one of various electronic devices constituting a home network, one of various electronic devices constituting a computer network, one of various electronic devices constituting a telematics network, a radio frequency identification (RFID) device, one of various components constituting a computing system, or an embedded system.

The nonvolatile memory or the device controller may be packed by a package such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

While the inventive concept has been described with reference to exemplary embodiments, it will be apparent to those skilled in the art that various changes and modifications may be made without departing from the scope of the present invention as defined by the following claims.

What is claimed is:

1. A data storage system, comprising:
a storage device;
a host connected to the storage device via a data line and a power line; and
a protocol analyzer, connected to the data line between the host and the storage device and not connected to the power line between the host and the storage device,
wherein the host is configured to communicate a non-signal to the storage device via the power line,
upon detecting the non-signal, the storage device is configured to return the non-signal to the host via the data line, and
the protocol analyzer is configured to monitor the non-signal via the data line from the storage device and determine whether the non-signal is normally transferred via the power line.

2. The storage system of claim 1,
wherein the storage device comprises a non-signal detector configured to detect the non-signal.

3. The storage system of claim 1,
wherein the host and the storage device are connected using a high-speed serial interface.

4. The storage system of claim 3,
wherein the high sped serial interface is one of serial ATA (SATA), universal flash storage (UFS), small computer small interface (SCSI), serial attached SCSI (SAS), and embedded multimedia (eMMC).

5. The storage system of claim 4,
wherein the non-signal indicates transition by the storage device into a device sleep mode and non-signal operating information from the storage device to the host includes start and end times for the device sleep mode.

6. The storage system of claim 4,
wherein the non-signal indicates transition by the storage device into a power-off mode.

7. The storage system of claim 1, wherein the storage device comprises:
a flash memory configured to store data; and
a device controller configured to control the flash memory,
wherein the device controller comprises a non-signal detector configured to detect the non-signal.

8. The storage system of claim 7,
wherein the device controller is further configured to communicate the non-signal to the host via the data line connected to a transmission (TX) terminal of a storage device.

9. The storage system of claim 8,
wherein the protocol analyzer is physically disposed along the data line between the storage device and the host.

10. An operating method for a data storage system including a storage device, a host connected to the storage device via a data line and a power line, and a protocol analyzer connected to the data line between the host and the storage device and not connected to the power line between the host and the storage device, the method comprising:
communicating a non-signal from the host to the storage device via the power line;
detecting the non-signal in the storage device and returning the non-signal to the host via the data line; and
monitoring, by protocol analyzer, the non-signal via the data line from the storage device and determining, by the protocol analyzer, whether the non-signal is normally transferred via the power line.

11. The method of claim 10,
wherein the non-signal indicates transition by the storage device into a device sleep mode.

12. The non signal analyzing method of claim 10,
wherein the host and the storage device are connected using a high-speed serial interface.

13. The non-signal analyzing method of claim 10,
wherein the non-signal indicates transition by the storage device into a power-off state.

* * * * *